(12) United States Patent
Lee et al.

(10) Patent No.: US 11,596,934 B2
(45) Date of Patent: Mar. 7, 2023

(54) PINCER-TYPE LIGAND HAVING ACRIDANE STRUCTURE AND METAL COMPLEX USING THE SAME

(71) Applicant: KOREA ADVANCED INSTITUTE OF SCIENCE AND TECHNOLOGY, Daejeon (KR)

(72) Inventors: Yunho Lee, Daejeon (KR); Changho Yoo, Daejeon (KR); Jonghoon Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 68 days.

(21) Appl. No.: 17/165,636

(22) Filed: Feb. 2, 2021

(65) Prior Publication Data
US 2021/0154650 A1    May 27, 2021

Related U.S. Application Data

(62) Division of application No. 16/260,086, filed on Jan. 28, 2019, now Pat. No. 10,974,237.

(30) Foreign Application Priority Data

Jan. 30, 2018    (KR) .................. 10-2018-0011432

(51) Int. Cl.
*B01J 31/24*    (2006.01)
*C07F 9/50*    (2006.01)
(Continued)

(52) U.S. Cl.
CPC ......... *B01J 31/2452* (2013.01); *C07F 9/5045* (2013.01); *C07F 9/64* (2013.01);
(Continued)

(58) Field of Classification Search
None
See application file for complete search history.

(56) References Cited

U.S. PATENT DOCUMENTS 6,290,926 B1    9/2001    Haenel et al.

OTHER PUBLICATIONS

Yoo et al. Angew. Chem. Int. Ed., 58, 56, 9502-9506 (Year: 2017).*
(Continued)

*Primary Examiner* — Yun Qian
(74) *Attorney, Agent, or Firm* — Hultquist, PLLC; Steven J. Hultquist

(57) ABSTRACT

Disclosed are a pincer-type ligand having a structurally rigid acridane structure and a metal complex consisting of the pincer-type ligand and a metal bound to each other, and exhibiting high reactivity and stability during a variety of bonding activation reactions. T-shaped complexes can be prepared from $^{acr}$PNP(4,5-bis(diisopropylphosphino)-2,7,9,9-tetramethyl-9H-acridin-10-ide), which is a pincer-type PNP ligand having an acridane structure, and metal complexes, which can be structurally rigid and thus exhibit excellent reactivity and stability based on minimized structural change thereof, can be prepared by introducing an acridane structure into the backbone thereof. The PNP ligand is structurally stable and has novel chemical properties, as compared to conventional similar ligands, and thus can be utilized in a wide range of catalytic reactions and material chemistry.

7 Claims, 6 Drawing Sheets
(2 of 6 Drawing Sheet(s) Filed in Color)

(51) Int. Cl.
 C07F 15/04 (2006.01)
 C07F 9/64 (2006.01)
 C07F 15/00 (2006.01)
 C07F 15/02 (2006.01)
 C07F 15/06 (2006.01)
(52) U.S. Cl.
 CPC ...... C07F 15/0066 (2013.01); C07F 15/0093 (2013.01); C07F 15/025 (2013.01); C07F 15/045 (2013.01); C07F 15/065 (2013.01); B01J 2531/004 (2013.01); B01J 2531/0255 (2013.01); B01J 2531/845 (2013.01)

(56) References Cited

OTHER PUBLICATIONS

Milstein et al. (Angew. Chem. Int. Ed., 2013, 52, 14131-14134). (Year: 2013).*
Adhikari, D., et al., "A Dinuclear Ni(I) System Having a Diradical NiN Diamond Core Resting State: Synthetic, Structural Spectroscopic Elucidation, and Reductive Bond Splitting Reactions", "Inorganic Chemistry", 2008, pp. 10479-10490, vol. 47, Publisher: American Chemical Society.
Adhikari, D., et al., "Structural, Spectroscopic, and Theoretical Elucidation of a Redox-Active Pincer-Type Ancillay Applied in Catalysis", "J. Am. Chem. Soc.", 2008, pp. 3676-3682, vol. 130, Publisher: American Chemical Society.
Alvarez, S., "Bonding and stereochemistry of three-coordinated transition metal compounds", "Coordination Chemistry Reviews", 1999, pp. 193-195, vol. 13, No. 41, Publisher: Elsevier.
Bai, G., et al., "A -Diketiminato-Nickel (II) Synthon for Nickel (I) Complexes", "Organometallics", 2005, pp. 5901-5908, vol. 24, Publisher: American Chemical Society.
Beck, R., et al., "Synthesis and chemistry of bis(triisopropylphosphine) nickel (I) and nickel (0) precursors", "Dalton Transactions", 2013, pp. 1461-1475, vol. 42, Publisher: RSC Publishing.
De Bruin, B., et al., "Fomation of Ethylene-Bridged Dinuclea Ir Species via M—C Coupling of Ir and Ir (ethene)", "Organometallics", 2002, pp. 4312-4314, vol. 21, Publisher: American Chemical Society.
Devillard, M., et al., "A Significant but Constrained Geometry Pt#Al Interaction: Fixation of CO and CS, Activation of H and PhCONH", "Journal of the American Chemical Society", 2016, p. 4917; DOI: 10.1021/jacs.6b01320, vol. 138, Publisher: ACS Publications.
Eckert, N., et al., "A T-Shaped Three-Coordinate Nickel (I) Carbonyl Complex and the Geometric Preferences of Three-Coordinate d Complexes", "Inorganic Chemistry", 2005, pp. 7702-7704, vol. 44, No. 22, Publisher: American Chemical Society.
Eller, P.G., et al., "Three Coordination in Metal Complexes", "Coordination Chemistry Reviews", 1977, pp. 1-95, vol. 24, Publisher: Elsevier Scientific Publishing Company.
Gunanathan, C., et al., "Long-Range Metal-Ligand Cooperation in H2 Activation and Ammonia-Promoted Hydride Transfer with a Ruthenium-Acridine Pincer Complex", "J. Am. Chem. Soc.", 2010, pp. 14763-14765, vol. 132.
Horn, B., et al., "N Activation in Ni—NN—Ni Units The Influence of Alkali Metal Catiions and CO Reactivity", "Z. Anorg. Allg. Chem.", 2011, pp. 1169-1174, vol. 637, Publisher: Wiley Online Library.
Iluc, V., et al., "Arrested 1,2-Hydrogen Migration from Silicon to Nickel upon Oxidation of a Three-Coordinate Ni(I) ilyl Complex", "J. Am. Chem. Soc.", 2010, pp. 11890-11892, vol. 132, Publisher: JACS Communications.
Ingleson, M., et al., "Influence of the d-Electron Count on CO Binding by Three-Coordinate [(tBu2PCH2sIm2)2N] Fe, —Co, and —Ni", "Inorganic Chemistry", 2008, pp. 407-409, vol. 47, No. 2, Publisher: American Chemical Society.
Laskowski, C., et al., "Synthesis and Reactivity of Two-Coordinate Ni(I) Alkyl and Aryl Complexes", "Journal of American Chemical Society", Nov. 18, 2013, pp. 1-5 Downloaded from http://pubs.acs.org, Publisher: ASC Publications.
Marlier, E., et al., "First-Row Tansition-Metal Chloride Complexes of the Wide Bite-ngle Diphosphine iPr DPDBFphos and Reactivity Studies of Monovalent Nickel", "Inorg. Chem.", 2011, pp. 9290-9299, vol. 50, Publisher: ACS Publications.
Page, M., et al., "Three-Coordinate Nickel (I) Complexes Stabilised by ix-, Seven- and Eight-Membered Ring N-Heterocyclic Carbenes: Synthesis, EPR/DFT Studies and Catalytic Activity", "Chem. Eur. J.", 2013, pp. 0-0 DOI: 10.1002/chem.201202950, vol. 00, Publisher: Wiley-VCH.
Pfirrmann, S., et al., "A Dinuclear Nickel (I) Dinitrogen Complex and its Reduction in Single-Electron Steps", "Agnewandte Chemie International Edition", 2009, pp. 3407-3411, vol. 121, Publisher: Wiley-VCH.
Pfirrmann, S., et al., "A Dinuclear Nickel (I) Dinitrogen Complex and its Reduction in Single-Electron Steps", "Angewandte Chemie International Edition", 2009, pp. 3357-3361 (English), vol. 48, Publisher: Wiley-VCH.
Pietrzyk, P., et al., "Resolving Conformation Dichotomy for Y- and T-Shaped Three-Coordinate Ni Carbonyl Complexes and Relativistic DFT Analysis of EPR Fingerprints", "Chem. Eur. J.", 2009, pp. 11802-11807, vol. 15, Publisher: Wiley-VCH.
Rozenel, S., et al., "Chemistry of Reduced Monomeric and Dimeric Cobalt Complexes Supported by a PNP Pincer Ligand", "Inorganic Chemistry", 2013, pp. 11544-11550, vol. 52, Publisher: ACS Publications.
Saraev, V.V., et al., "Synthesis, Molecular Structure, and EPR Analysis of the Three-Coordinate Ni(I) Complex [Ni (PPh)][BF]", "J. Phys. Chem. A", 2008, pp. 12449-12455, vol. 112, Publisher: American Chemical Society.
Srimani, D., et al., "Iron Pincer Complex Catalyzed, Environmentally Benign, E-Selective Semi-Hydrogenation of Alkynes", "Angew. Chem.", 2013, pp. 14381-14384, vol. 125.
Studer, A., et al., "Catalysis of Radical Reactions: A Radical Chemistry Perspective", "Agnewante Chemie International Edition", 2016, pp. 58-102, vol. 55, Publisher: Wiley-VCH.
Vreeken, V., et al., "C—H Activation of Benzene by a Photoactivated Ni (azide): Formulation of a Transient Nickel Nitrido Complex", "Angew. Chem.", 2015, pp. 7161-7165, vol. 127, Publisher: Wiley-VCH.
Vreeken, V., et al., "C—H Activation of Benzene by a Photoactivated Ni II (azide): Formation of a Transient Nickel Nitrido Complex", "Angewandte Chemie International Edition", 2015, pp. 7055-7059, vol. 54, No. 24, Publisher: Wiley-VCH.
Wayland, B., et al., "Activation of Methane an Toluene by Rhodium (II) Porphyrin Complexes", "J. Am. Chem. Soc.", 1991, pp. 5305-5311, vol. 113, Publisher: American Chemical Society.
Wayland, B., et al., "Reactions of H (D) with a Rhodium (II) Metalloradical: Kinetic Evidence for a Four-Centered Transition State", "Inorg. Chem.", 1992, pp. 148-150, vol. 31, Publisher: American Chemical Society.
Yoo, C., et al., "Transmethylation of a four-coordinate nickel(I) monocarbonyl species with methyl iodide", "Chemical Science", 2014, pp. 3853-3858, vol. 5, Publisher: The Royal Society of Chemistry.
Yoo, C., et al., "A T-shaped Ni(I) Metalloradical Species", "Angewandte Chemie International Edition", Jun. 7, 2017, p. 10.1002/anie.201704487, Publisher: Wiley-VCH.
Zhang, K., et al., "N-Heterocyclic Carbene Bound Nickel (I) Complexes and Their Roles in Catalysis", "Organometallics", 2011, pp. 2546-2552, vol. 30, Publisher: ASC Publications.

* cited by examiner

PINCER-TYPE LIGAND HAVING ACRIDANE STRUCTURE AND METAL COMPLEX USING THE SAME

CROSS-REFERENCE TO RELATED APPLICATIONS

This is a divisional under 35 USC § 120 of U.S. patent application Ser. No. 16/260,086 filed Jan. 28, 2019 for "PINCER-TYPE LIGAND HAVING ACRIDANE STRUCTURE AND METAL COMPLEX USING THE SAME", which in turn claims the priority under 35 USC § 119 of Korean Patent Application 10-2018-0011432 filed Jan. 30, 2018. The disclosures of U.S. patent application Ser. No. 16/260,086 and Korean Patent Application 10-2018-0011432 are hereby incorporated herein by reference, in their respective entireties, for all purposes.

TECHNICAL FIELD

The present invention relates a pincer-type ligand having an acridane structure and a metal complex using the same and more particularly, to a pincer-type ligand having a structurally rigid acridane structure and a metal complex consisting of the pincer-type ligand and a metal bound to each other and exhibiting high reactivity and stability during a variety of bonding activation reactions.

BACKGROUND ART

The catalyst market is estimated to be about 20 trillion won worldwide, from which many chemical processes are derived. Various organometallic complexes have been utilized as catalysts and in particular, coordinatively unsaturated metal complexes have received a great deal of attention due to certain electronic structure and reactivity thereof (P. G. Eller et al., Coord. Chem. Rev. 1977, 24, 1; S. Alvarez, Coord. Chem. Rev. 1999, 193, 13). For example, three-coordinate metal centers are generally designed to adopt the systems of triangular plane ($D_{3h}$) coordinates in order to minimize the steric repulsion between three donors. However, the $d^9$ system may adopt a T-shaped structure to solve the Jahn-Teller forbidden state shown in FIG. 1 (S. Alvarez, Coord. Chem. Rev. 1999, 193, 13; P. Pietrzyk et al., Chem. Eur. J. 2009, 15, 11802; N. A. Eckert et al., Inorg. Chem. 2005, 44, 7702). As a result, potentially reactive binding sites that can be sterically accessible to small molecules are created. Since unpaired electrons occupy the $d_{x^2-y^2}$ orbital, T-shaped complexes are ideal candidates to utilize reactivity associated with metalloradicals (B. B. Wayland et al., J. Am. Chem. Soc. 1991, 113, 5305; B. B. Wayland et al., Inorg. Chem. 1992, 31, 148; A. Studer, D. P. Curran, Angew. Chem. Int. Ed. 2016, 55, 58). However, it is difficult to prepare a T-type morphology and previous attempts have often been made with Y-shaped structures using β-diketiminate (N. A. Eckert et al., Inorg. Chem. 2005, 44, 7702; B. Horn et al., Allg. Chem. 2011, 637, 1169; S. Pfirrmann et al., Angew. Chem. Int. Ed. 2009, 48, 3357; Angew. Chem. 2009, 121, 3407; G. Bai et al., Organometallics 2005, 24, 5901), N-heterocyclic carbene (C. A. Laskowski et al., J. Am. Chem. Soc. 2013, 135, 18272; M. J. Page et al., Chem. Eur. J. 2013, 19, 2158; K. Zhang et al., Organometallics 2011, 30, 2546) and bulker phosphine ligands (R. Beck et al., Dalton Trans. 2013, 42, 1461; E. E. Marlier et a; Inorg. Chem. 2011, 50, 9290; V. M. Iluc et al., J. Am. Chem. Soc. 2010, 132, 11890; V. V. Saraev et al., J. Phys. Chem. A 2008, 112, 12449). In addition, pincer-type ligands have been studied to accommodate T-shaped sterically protected metal centers (D. Adhikari et al., Inorg. Chem. 2008, 47, 10479; S. S. Rozenel et al., Inorg. Chem. 2013, 52, 11544; M. J. Ingleson et al., Inorg. Chem. 2008, 47, 407). Unfortunately, structural flexibility excluded successful separation of desired species (D. Adhikari et al., Inorg. Chem. 2008, 47, 10479; S. S. Rozenel et al., Inorg. Chem. 2013, 52, 11544).

Reactions involving two metals, apart from standard radical-type reactions, can be a potent method to improve the availability of $d_{x^2-y^2}$-based radicals. For example, it has been previously reported that two $Rh^{II}$-$d^7$ porphyrin complexes operate together to activate methane (FIG. 1($b$), B. B. Wayland et al., J. Am. Chem. Soc. 1991, 113, 5305; B. B. Wayland et al., Inorg. Chem. 1992, 31, 148). A similar method with T-shaped $d^9$ species is possible and is currently under investigation. $Ni^I$ is particularly interesting because it is often involved in cross-coupling reactions and small molecule activation. Thus, the key to utilize the inherent reactivity of metals is to prepare structurally rigid supporting ligands that will allow for cooperative binuclear reactions.

As described above, T-shaped metal complexes are useful due to certain electronic structure and reactivity thereof, but have a problem of difficulty associated with manufacturing. Accordingly, there is a need for structurally rigid ancillary ligands that can be utilized for binuclear reactions using inherent reactivity of metals, while solving the problem.

As a result of intensive efforts to solve the aforementioned problems, the present inventors have found that T-shaped $Ni^I$ complexes having $^{acri}$PNP (4,5-bis(diisopropylphosphino)-2,7,9,9-tetramethyl-9H-acridin-10-ide), which is a pincer-type PNP ligand having an acridane structure, can be prepared, and that metal complexes, which can be structurally rigid and thus exhibit excellent reactivity and stability based on minimized structural change thereof, can be prepared by introducing an acridane structure into the backbone thereof, and that the metal complexes can participate in a number of certain various bond activation reactions, thereby completing the present invention.

DISCLOSURE OF INVENTION

Therefore, it is an object of the present invention to provide a pincer-type ligand having a structurally rigid acridane structure and a metal complex having unusual reactivity and stability during a variety of bonding activation reactions.

The object can be accomplished by the present invention described below.

In accordance with the present invention, the above and other objects can be accomplished by the provision of a PNP ligand having an acridane structure represented by the following Chemical Formula 1:

[Chemical Formula 1]

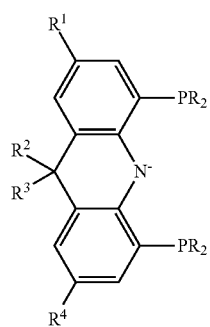

wherein R, $R^1$, $R^2$, $R^3$ and $R^4$ are each independently hydrogen, a C1 to C20 alkyl group, a halogen-substituted C1 to C20 alkyl group, a C2 to C20 alkenyl group, a halogen-substituted C2 to C20 alkenyl group, a C1 to C20 alkoxy group, a halogen-substituted C1 to C20 alkoxy group, a C3 to C20 cycloalkyl group, a halogen-substituted C3 to C20 cycloalkyl group, a C6 to C40 aryl group, a C5 to C40 heteroaryl group, halogen, C1 to C20 alkylamine, C6 to C40 arylamine, C7 to C60 alkylarylamine, a C1 to C20 thioalkyl group, a C6 to C40 thioaryl group, C1 to C20 alkyl phosphine or C6 to C40 aryl phosphine.

In accordance with another aspect of the present invention, provided is a metal complex including the PNP ligand and a metal bound to each other.

In accordance with another aspect of the present invention, provided is a method of preparing a metal complex represented by the following Chemical Formula 2, including:

(a) producing a compound of Chemical Formula 5 by reacting a compound of Chemical Formula 4 with 3 equivalents of alkyl lithium, aryl lithium or a Grignard reagent and 2 equivalents of one compound selected from the group consisting of halogen-substituted alkyl phosphine or aryl phosphine and linear ether, cyclic ether, alkyl amine, aryl amine and a sulfur compound; and (b) producing a metal complex of Chemical Formula 2 by adding $MX_2$, wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc, to the compound of Chemical Formula 5 to induce metalation:

[Chemical Formula 2]

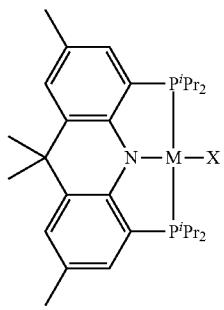

wherein M is Fe, Co, Ni, Co, Pd or Pt, and X is Cl, Br, OTf, $ClO_4$ or OAc.

[Chemical Formula 4]

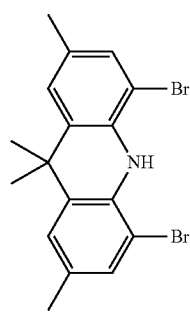

[Chemical Formula 5]

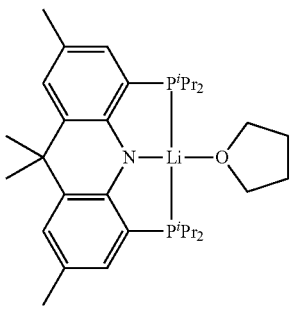

In accordance with another aspect of the present invention, provided is a method of preparing a metal complex represented by the following Chemical Formula 3, including:

(a) producing a compound of Chemical Formula 5 by reacting a compound of Chemical Formula 4 with 3 equivalents of alkyl lithium, aryl lithium or a Grignard reagent and 2 equivalents of one compound selected from the group consisting halogen-substituted alkyl phosphine or aryl phosphine and linear ether, cyclic ether, alkyl amine, aryl amine and a sulfur compound;

(b) producing a metal complex of Chemical Formula 2 by adding $MX_2$, wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc, to the compound of Chemical Formula 5 to induce metalation; and (c) producing a metal complex of Chemical Formula 3 by adding a reducing agent to the metal complex of Chemical Formula 2,

[Chemical Formula 2]

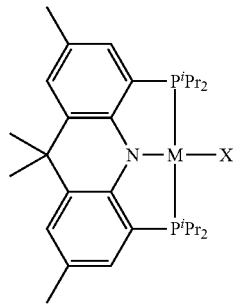

wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc;

[Chemical Formula 3]

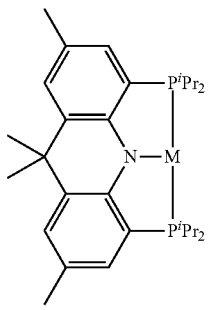

wherein M is Al, Cr, Fe, Co, Ti, W, Si, Ir, Rh, Pt, Pd, Ru, Th, Ni, Cu, V, Au, Re, Zr or Mo.

[Chemical Formula 4]

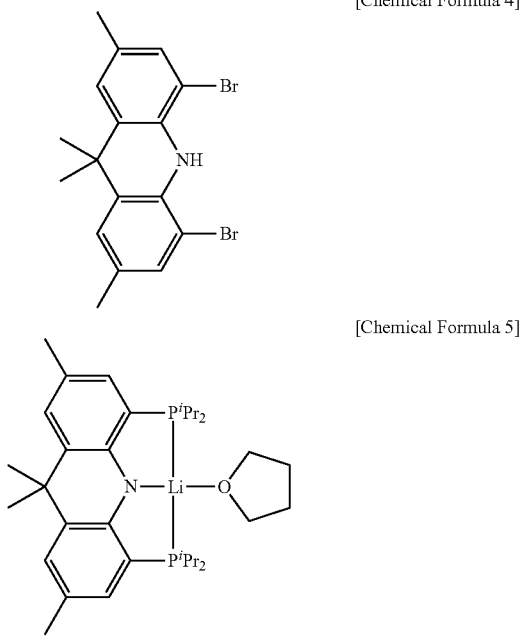

[Chemical Formula 5]

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

BEST MODE FOR CARRYING OUT THE INVENTION

Figure 1:
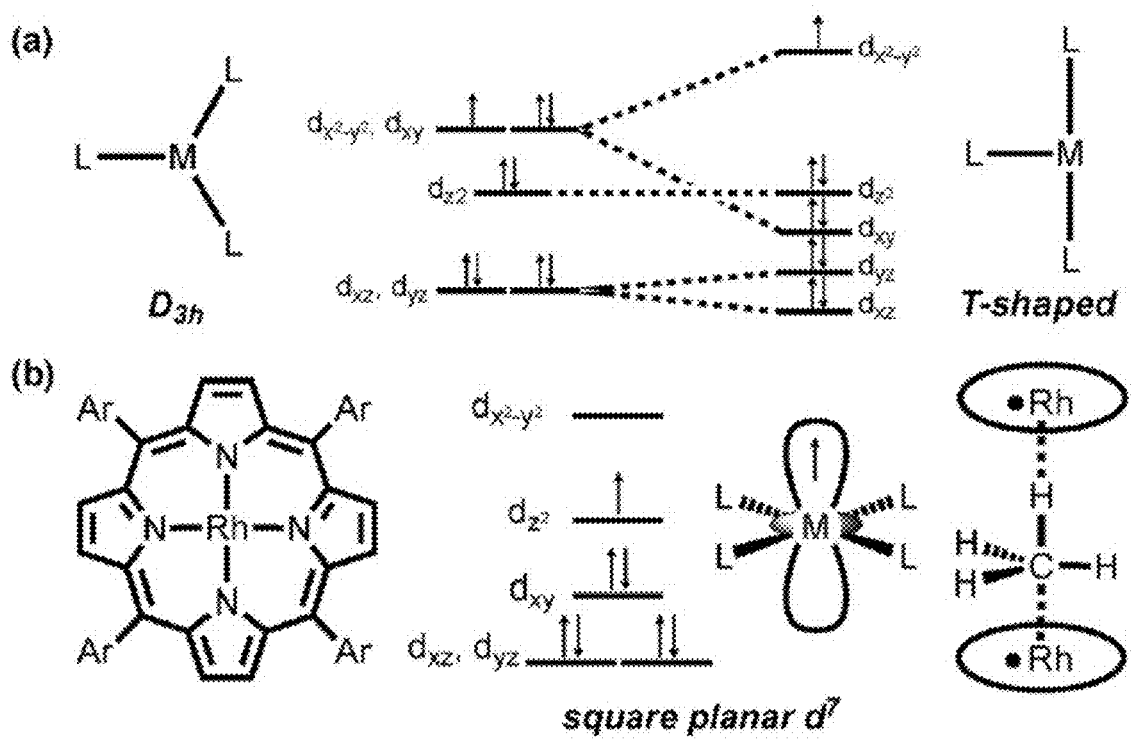
FIG. 1 schematically shows an electronic structure of $D_{3h}$ and a T-shaped morphology structure of the $d^9$ system (a) and SOMO of $d^7$ Rh porphyrin species and C—H bond activation (b)

Unless defined otherwise, all technical and scientific terms used herein have the same meaning as those appreciated by those skilled in the field to which the present invention pertains. In general, nomenclature used herein is well-known in the art and is ordinarily used.

As a result of intensive efforts to solve the aforementioned problems, the present inventors have found that T-shaped complexes can be prepared from $^{acri}$PNP ligand (4,5-bis(diisopropylphosphino)-2,7,9,9-tetramethyl-9H-acridin-10-ide), which is a pincer-type PNP ligand having an acridane structure, and that metal complexes, which can be structurally rigid and thus exhibit excellent reactivity and stability based on minimized structural change thereof, can be prepared by introducing an acridane structure into the backbone thereof.

In one aspect, the present invention provides $^{acri}$PNP (4,5-bis(diisopropylphosphino)-2,7,9,9-tetramethyl-9H-acridin-10-ide), which is an acridane-based PNP ligand having the backbone into which an acridane moiety is introduced, and a metal complex including the PNP ligand and a metal bound to each other.

In another aspect, the present invention is directed to a PNP ligand having an acridane structure represented by the following Chemical Formula 1:

[Chemical Formula 1]

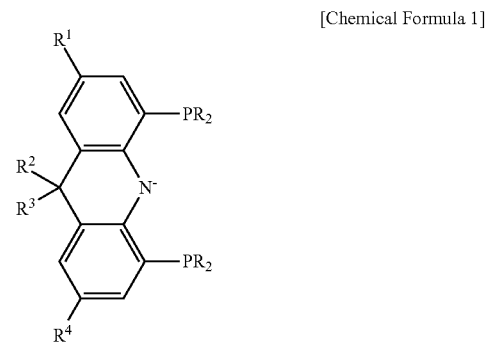

wherein R, $R^1$, $R^2$, $R^3$ and $R^4$ are each independently hydrogen, a C1 to C20 alkyl group, a halogen-substituted C1 to C20 alkyl group, a C2 to C20 alkenyl group, a halogen-substituted C2 to C20 alkenyl group, a C1 to C20 alkoxy group, a halogen-substituted C1 to C20 alkoxy group, a C3 to C20 cycloalkyl group, a halogen-substituted C3 to C20 cycloalkyl group, a C6 to C40 aryl group, a C5 to C40 heteroaryl group, halogen, C1 to C20 alkylamine, C6 to C40 arylamine, C7 to C60 alkylarylamine, a C1 to C20 thioalkyl group, a C6 to C40 thioaryl group, C1 to C20 alkyl phosphine or C6 to C40 aryl phosphine.

Regarding R, $R^1$, $R^2$, $R^3$ and $R^4$, preferred examples of the C1 to C20 alkyl group include methyl, ethyl, propyl, pentyl, hexyl, isopropyl, butyl, sec-butyl, tert-butyl groups and the like, preferred examples of the C2 to C20 alkenyl group include vinyl, allyl, 1-butenyl, 2-butenyl, 3-butenyl and isobutenyl groups and the like, and preferred examples of the halogen-substituted C1 to C20 alkyl group include C1 to C4 alkyl groups substituted by at least one fluorine, chlorine, bromine or iodine atom, such as, fluoromethyl, difluoromethyl, trifluoromethyl, pentafluoroethyl, 1,1-difluoroethyl and trichloromethyl groups, but are not limited thereto.

The C1 to C20 alkoxy group includes oxygen substituted by one of the aforementioned C1 to C20 alkyl groups, and the halogen includes fluorine, chlorine, bromine and iodine.

The C6 to C40 arylamine includes phenyl, naphthyl, phenanthryl, anthracyl, indenyl, azulenyl, biphenyl, biphenylenyl or fluorenyl group or the like.

The C1 to C20 alkylamine may be primary alkylamine, secondary alkylamine or tertiary alkylamine, the C6 to C40 arylamine may be primary arylamine, secondary arylamine or tertiary arylamine, and the C7 to C60 alkylarylamine may be secondary alkylarylamine, tertiary dialkylarylamine, or tertiary alkylarylamine.

The C1-C20 thioalkyl includes methylthio, ethylthio, propylthio, 1-methylethylthio, butylthio, 1-methylpropylthio, 2-methylpropylthio, 1,1-dimethylethylthio, pentylthio, 1-methylbutylthio, 2-methylbutylthio, 3-methylbutylthio, 2,2-dimethylpropylthio, 1-ethylpropylthio, hexylthio, 1,1-dimethylpropylthio, 1,2-di-methylpropylthio, 1-methylpentylthio, 2-methylpentylthio, 3-methylpentylthio, 4-methylpentylthio, 1,1-dimethylbutylthio, 1,2-dimethylbutylthio, 1,3-dimethylbutylthio, 2,2-dimethylbutylthio, 2,3-dimethylbutylthio, 3,3-dimethylbutylthio, 1-ethylbutylthio, 2-ethylbutylthio, 1,1,2-trimethylpropylthio, 1,2,2-trimethylpropylthio, 1-ethyl-1-methylpropylthio, 1-ethyl-2-methylpropylthio, or the like, but is not limited thereto.

The PNP ligand according to the present invention may be represented by the following Chemical Formula 1-1:

[Chemical Formula 1-1]

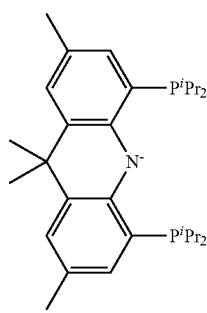

In another aspect, the present invention is directed to a metal complex including the PNP ligand and a metal bound to each other.

The metal complex according to the present invention may be represented by $(PNP)MX_n$ (wherein n=0, 1, 2 or 3, and X is ABC, in which A, B and C are each independently represented by a monodentate ligand or bidentate ligand.

A preferred example of the metal complex according to the present invention may be represented by Chemical Formula 2 or Chemical Formula 3:

[Chemical Formula 2]

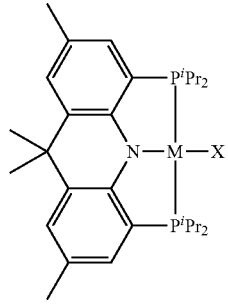

wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc;

[Chemical Formula 3]

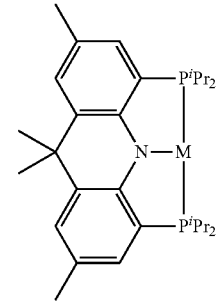

wherein M is Al, Cr, Fe, Co, Ti, W, Si, Ir, Rh, Pt, Pd, Ru, Th, Ni, Cu, V, Au, Re, Zr or Mo.

A more preferred example of the metal complex according to the present invention may be selected from the group consisting of Chemical Formulas 2-1 to 2-5 and Chemical Formula 3-1:

[Chemical Formula 2-1]

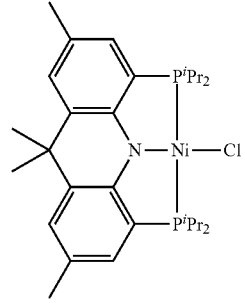

[Chemical Formula 2-2]

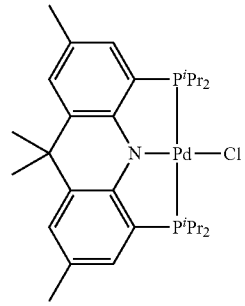

-continued

[Chemical Formula 2-3]

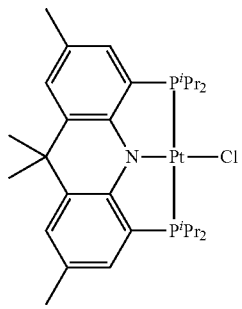

[Chemical Formula 2-4]

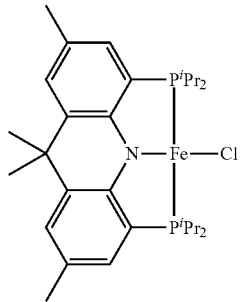

[Chemical Formula 2-5]

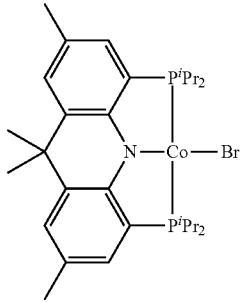

[Chemical Formula 3-1]

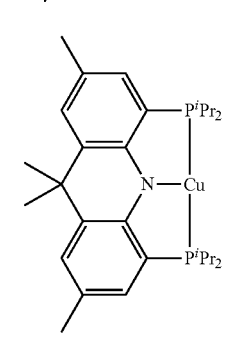

In another aspect, the present invention is directed to a method of preparing a metal complex represented by the following Chemical Formula 2, including:

(a) producing a compound of Chemical Formula 5 by reacting a compound of Chemical Formula 4 with 3 equivalents of alkyl lithium, aryl lithium or a Grignard reagent and 2 equivalents of one compound selected from the group consisting of halogen-substituted alkyl phosphine or aryl phosphine and linear ether, cyclic ether, alkyl amine, aryl amine and a sulfur compound; and (b) producing a metal complex of Chemical Formula 2 by adding $MX_2$, wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc, to the compound of Chemical Formula 5 to induce metalation:

[Chemical Formula 2]

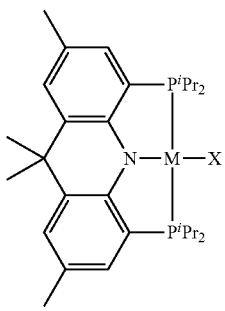

wherein M is Fe, Co, Ni, Co, Pd or Pt, and X is Cl, Br, OTf, $ClO_4$ or OAc.

[Chemical Formula 4]

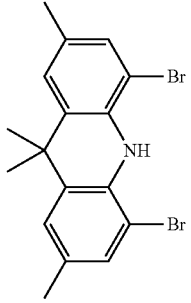

[Chemical Formula 5]

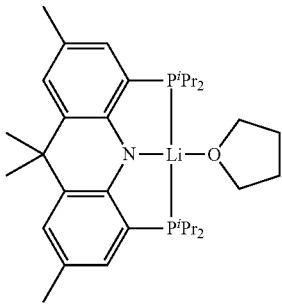

In a preferred embodiment, the method may include: (a) reacting the compound of Chemical Formula 4 with 3 equivalents of n-BuLi and 2 equivalents of i-$Pr_2$PCl and THF to produce a compound of Chemical Formula 5; and (b) adding $MX_2$ (wherein M is Al, Cr, Fe, Co, Ti, W, Si, Ir, Rh, Pt, Pd, Ru, Th, Ni, Cu, V, Au, Re, Zr or Mo, and X is Cl, Br, OTf, $ClO_4$ or OAc) to the compound of Chemical Formula 5 to induce metalation and thereby produce a metal complex of Chemical Formula 2.

In another aspect, the present invention is directed to a method of preparing a metal complex represented by the following Chemical Formula 3, including:

(a) producing a compound of Chemical Formula 5 by reacting a compound of Chemical Formula 4 with 3 equivalents of alkyl lithium, aryl lithium or a Grignard reagent and 2 equivalents of one compound selected from the group consisting halogen-substituted alkyl phosphine or aryl phosphine and linear ether, cyclic ether, alkyl amine, aryl amine and a sulfur compound;

(b) producing a metal complex of Chemical Formula 2 by adding $MX_2$, wherein M is Al, Cr, Fe, Co, Ti, W, Si, Ir, Rh, Pt, Pd, Ru, Th, Ni, Cu, V, Au, Re, Zr or Mo, and X is Cl, Br, OTf or OAc, to the compound of Chemical Formula 5 to induce metalation; and (c) producing a metal complex of Chemical Formula 3 by adding a reducing agent to the metal complex of Chemical Formula 2,

[Chemical Formula 2]

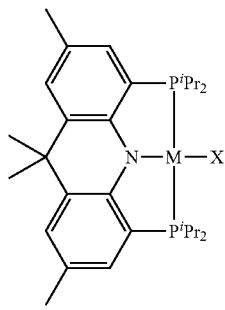

wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO$_4$ or OAc;

[Chemical Formula 3]

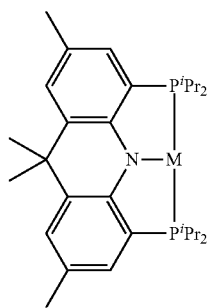

wherein M is Al, Cr, Fe, Co, Ti, W, Si, Ir, Rh, Pt, Pd, Ru, Th, Ni, Cu, V, Au, Re, Zr or Mo.

[Chemical Formula 4]

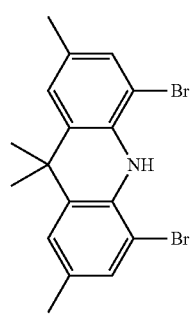

[Chemical Formula 5]

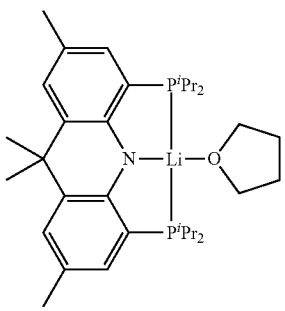

In a preferred embodiment, the method may include: (a) reacting the compound of Chemical Formula 4 with 3 equivalents of n-BuLi and 2 equivalents of i-Pr2PCl and THF to produce a compound of Chemical Formula 5; (b) adding MX$_2$ (wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO$_4$ or OAc) to the compound of Chemical Formula 5 to induce metalation and thereby produce a metal complex of Chemical Formula 2; and (c) a reducing agent including NaC$_{10}$H$_8$ as well as LiC$_{10}$H$_8$, KC$_{10}$H$_8$, Li(Hg), Na(Hg), K(Hg), Li(anthracene), Na(anthracene), K(anthracene), Li, Na, K, Li(benzophenone), Na(benzophenone), K(benzophenone), Li(acenaphthalene), Na(acenaphthalene), K(acenaphthalene), LiC$_8$, NaC$_8$ or KC$_8$ to the metal complex of Chemical Formula 2 to produce a metal complex of Chemical Formula 3.

Hereinafter, the present invention will be described in more detail with reference to examples. However, it is obvious to those skilled in the art that these examples are provided only for illustration of the present invention and should not be construed as limiting the scope of the present invention.

EXAMPLE

Example 1: Preparation of Ligand and Metal Complex

Figure 2:
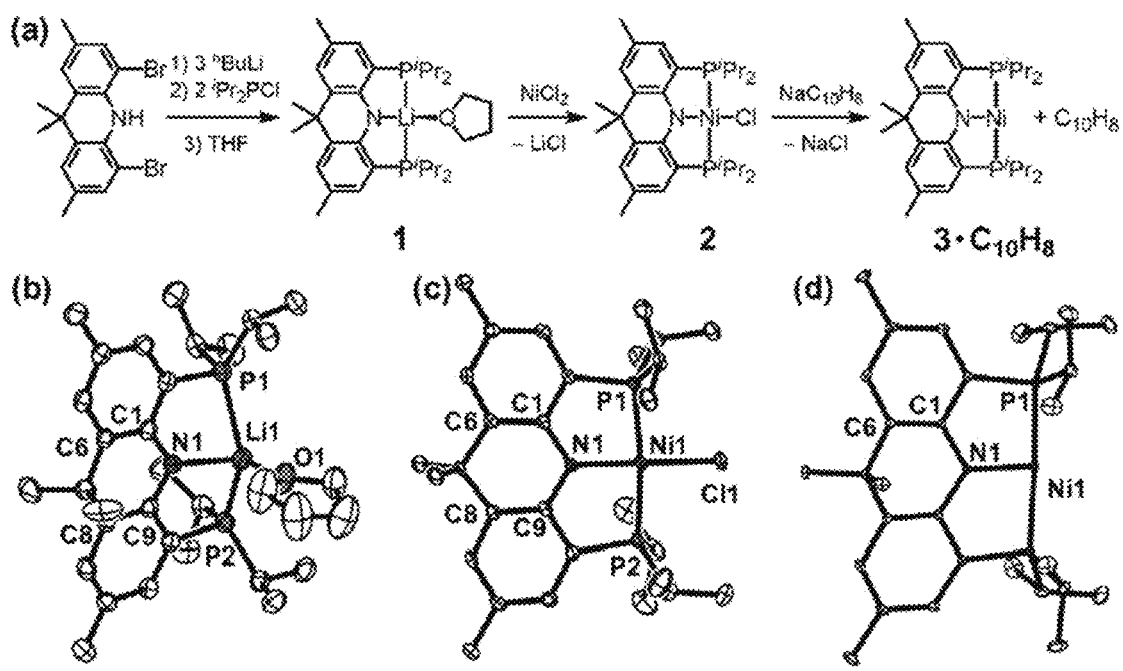
FIG. 2 shows a synthesis process of Compound 3 according to the present invention (a) and crystal structures of Compound 1 (b), Compound 2 (c) and Compound 3 (d) (wherein thermal ellipsoids are set at a probability of 50%, and co-crystallized $C_{10}H_8$ molecules and hydrogen atoms are omitted for clarity)

For ligand synthesis, 4,5-dibromo-2,7,9,9-tetramethyl-9, 10-dihydroacridine) was prepared (H. Liu et al., Lett. Org. Chem. 2010, 7, 114). The phosphine arm was installed by lithiation with PiPr$_2$Cl and subsequent phosphorylation. The $^{acri}$PNP ligand was isolated as a lithium adduct with the THF molecule, ($^{acri}$PNP)Li(THF) (Compound 1 of FIG. 2) in an appropriate yield (55%). In the $^{31}$P NMR spectrum, Compound 1 shows a quartet peak at 3.3 ppm ($^1J_{PLi}$=55 Hz), which indicates that two phosphorus donors are coordinated symmetrically to the lithium ion. X-ray diffraction studies show that the $^{acri}$PNP ligand is prone to planarity (FIG. 2(b) and Table 1).

TABLE 1

Selected bond lengths and angles of 1, 2, and 3.

| Parameter | 1 | 2 | 3 |
|---|---|---|---|
| d$_{M-N}$ [Å] | 1.952(4) | 1.894(2) | 1.943(1) |
| d$_{M-P}$ [Å] | 2.495(4) | 2.1821(6) | 2.1980(5) |
|  | 2.499(4) | 2.1797(6) |  |
| d$_{M-L}$ [Å] | 1.919(4)[a] | 2.1767(6)[b] | — |
| ∡ N-M-L [°] | 117.6(2)[a] | 178.88(6)[b] | — |
| ∡ P-M-P [°] | 130.8(2) | 171.61(2) | 171.39(2) |

TABLE 1-continued

Selected bond lengths and angles of 1, 2, and 3.

| Parameter | 1 | 2 | 3 |
|---|---|---|---|
| ∡ N-M-P [°] | 81.4(2) | 86.78(5) | 87.06(9) |
|  | 82.2(2) | 86.67(5) |  |

[a]L = O.
[b]L = Cl.

The reaction of Compound 1 with NiCl$_2$ in THF results in generation of ($^{acri}$PNP)NiCl (Compound 2 of FIG. 2) as a green powder with a yield of 81%. The $^{31}$P NMR spectrum showed a single peak at 41.0 ppm and the solid state structure of Compound 2 showed that the $^{acri}$PNP ligand had a square planar structure ($\tau_4$=0.07, FIG. 2(c)). One reversible wave at 0.13V and two irreversible waves at −2.28 and −2.80V, were shown, as compared with Fc/Fc$^+$(Fc=[(η-C$_5$H$_5$)$_2$Fe]).

The Mindiola group reported a similar (PNP)NiCl complex (PNP$^-$=N[2-P$^i$Pr$_2$-4-Me-C$_6$H$_3$]$_2$) which shows an irreversible Ni$^{II/I}$ couple at 2.48V, producing a dimeric Ni$^I$ species, {(μ$_2$-PNP)Ni}$_2$ (D. Adhikari et al., Inorg. Chem. 2008, 47, 10479; D. Adhikari et al., J. Am. Chem. Soc. 2008, 130, 3676; b) V. Vreeken et al., Angew. Chem. Int. Ed. 2015, 54, 7055; Angew. Chem. 2015, 127, 7161). In contrast, Compound 2 does not produce any dimeric species after chemical reduction. The new brown species was immediately produced upon addition of one equivalent of NaC$_{10}$H$_8$ and exhibited a semi-permanently shifted $^1$H NMR spectrum. The nickel (I) species, ($^{acri}$PNP)Ni (Compound 3) with neutral naphthalene molecules co-crystallized during recrystallization of a pentane solution was obtained in a yield of 72%. The solid state structure showed that the nickel center had a T-shaped geometry (FIG. 2(d)). Dimer formation of Compound 3 was completely inhibited. As a result, the acridane skeleton of the present invention is supported. Since the $^{acri}$PNP ligand is pre-organized, Compound 3 has an almost perfect T-type structure with L-M-L angles of 87.06 (9), 87.06 (9) and 171.39 (2)° (Table 1). A similar 3-coordinate nickel complex supported by the pincer-type ligand, ($^{Si}$PNP)Ni($^{Si}$PNP=(R$_2$PCH$_3$SiMe$_2$)$_2$N$^-$ was reported by Caulton (M. J. Ingleson et al., Inorg. Chem. 2008, 47, 407). In this case, because the bite angle of two phosphines is greater than about 190° and the silicon atoms of the ligand backbone are large, the nickel is surrounded and protected by the ligand. Surprisingly, there is no intramolecular or intermolecular interaction at the coordination sites available for the nitrogen donors, although the 3-coordinate nickel ion of Compound 3 is considerably exposed. The closest H atom of the co-crystallized naphthalene in the crystal lattice is 2.926 Å from Ni.

Figure 3:
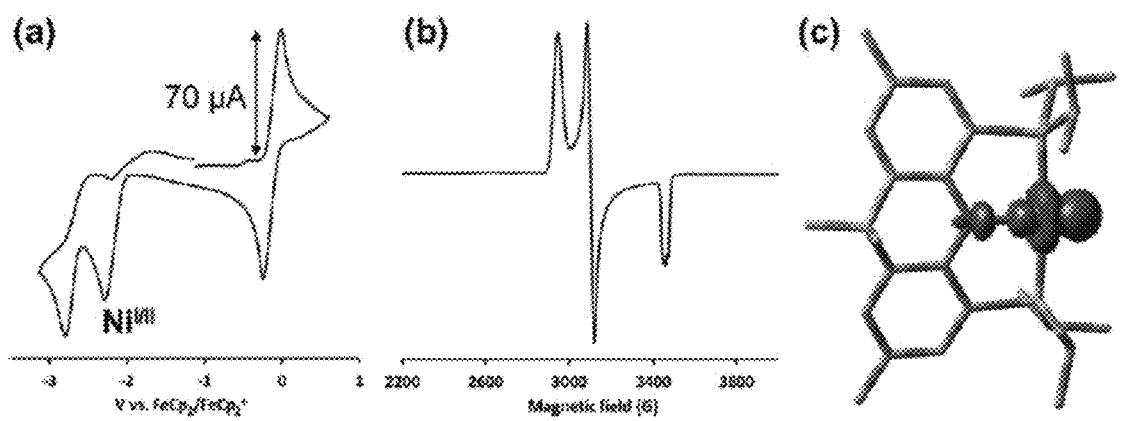
FIG. 3 is a cyclic voltammogram (a) of Compound 2 in THF according to the present invention, an X-band EPR spectrum (b) of Compound 3, and a Mulliken atomic spin density plot (c), wherein Ni 72.6%, P1 7.8%, P2 7.8%, N 6.8%.
Figure 4:
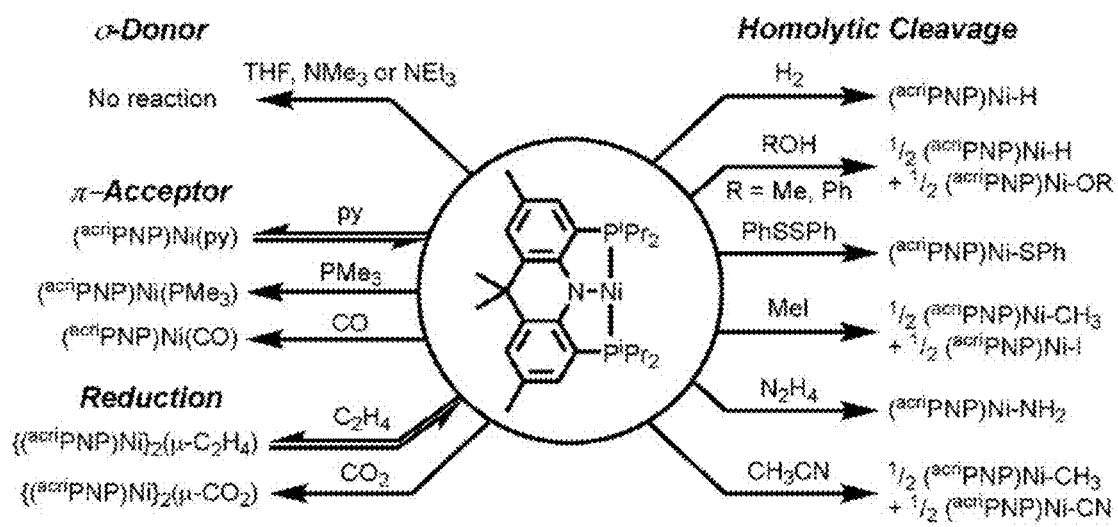
FIG. 4 shows various metalloradical reactivity allowing for use of Compound 3 according to the present invention.
Figure 5:
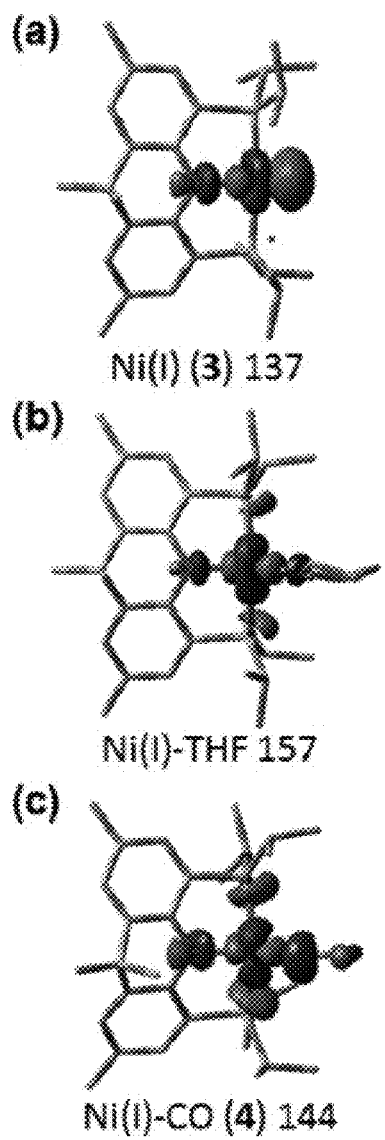
FIG. 5 shows SOMO of Compound 3 according to the present invention; SOMO of Compound 3 (a), ($^{acri}$PNP)Ni and SOMO of Compound 4 (b), ($^{acri}$PNP)Ni(THF) (c), and electronic structures of Compound 3, ($^{acri}$PNP)Ni(THF) and Compound 4 (d)
Figure 5:
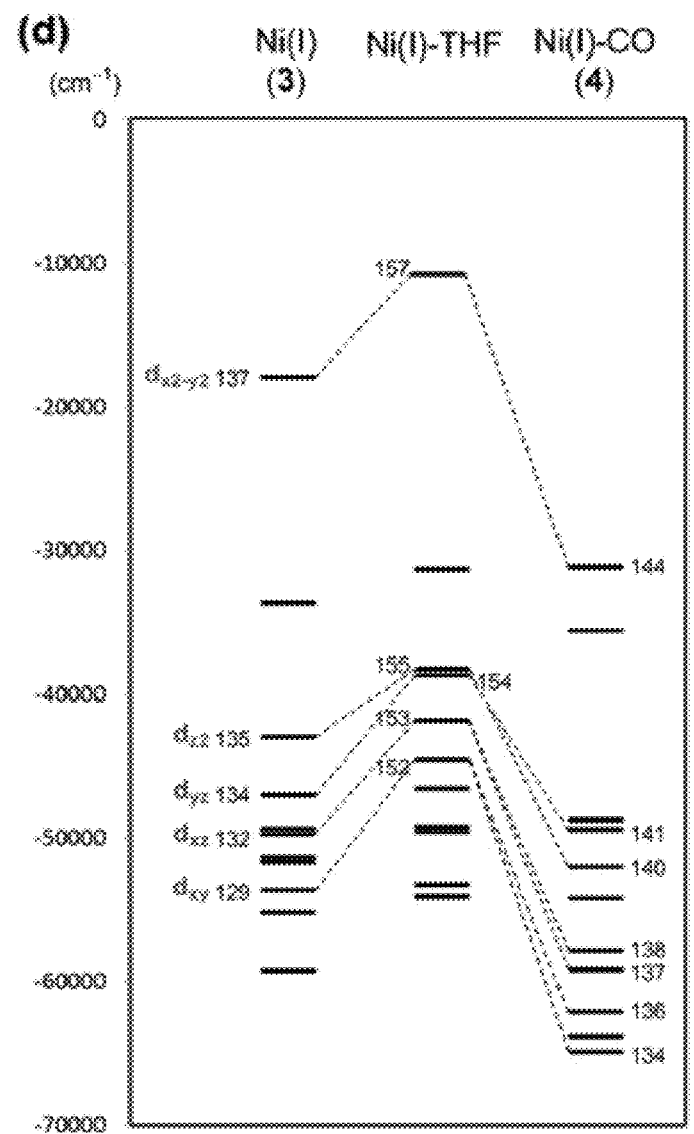
Figure 6:
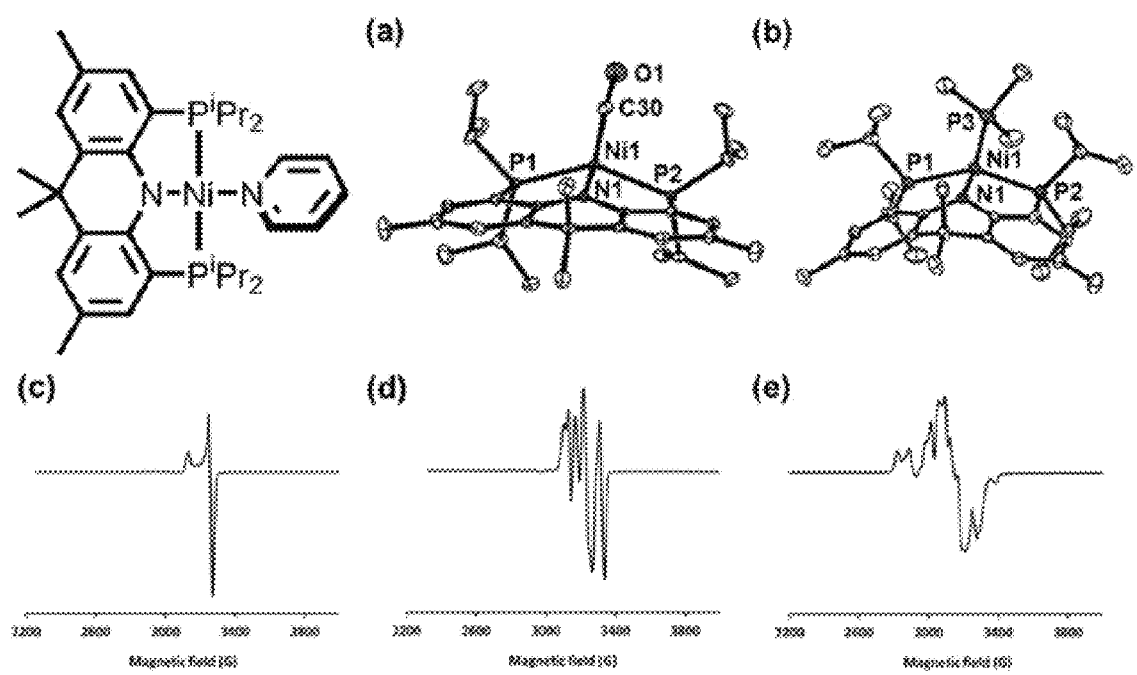
FIG. 6 shows a chemical structure and of ($^{acri}$PNP)Ni(py) of Compound 5 according to the present invention, a crystal structure of ($^{acri}$PNP)NiCO of Compound 6 (a) and crystal structure of ($^{acri}$PNP)Ni(PMe$_3$) of Compound 7 (wherein thermal ellipsoids are set at a probability of 50%, and $C_{10}H_8$ molecules and hydrogen atoms are omitted for clarity), and X-band EPR spectra collected at 113K for Compounds 5, 6 and 7 (c, d and e)

Compound 3 exhibits an S=1/2 ground state according to Evans' method ($\mu_{eff}$=1.78 μB at C$_6$D$_6$) and X-band electron paramagnetic resonance (EPR) spectroscopic data (g=1.99, 2.22, 2.33, FIG. 3(b)). DFT calculations using the Mulliken population analysis performed on Compound 3 suggest that about 73% of unpaired spins are positioned on the Ni phase (FIG. 3(c)). Accordingly, the T-shaped Ni$^I$ center has a d$_{x^2-y^2}$ orbital that is half-filled with a singly occupied molecular orbital (SOMO) (M. J. Ingleson et al., Inorg. Chem. 2008, 47, 407; C. Yoo et al., Chem. Sci. 2014, 5, 3853). This is because the addition of the fourth ligand is difficult in consideration of energy due to the σ-antibonding property of SOMO. Possible binding of σ-donors such as THF, NMe$_3$ and NEt$_3$ was tested, but the formation of adducts could not be detected (FIG. 4). The geometric optimization of ($^{acri}$PNP)Ni(THF) could not stabilize the Ni—O bond through DFT calculations and the THF molecules remained unbound. The optimized structure of ($^{acri}$PNP)Ni(THF) obtained by freezing Ni—O bonds showed a significant increase in SOMO energy level, as compared to Compound 3 (FIG. 5).

π-accepting ligands such as pyridine bind to Compound 3, possibly using stabilization associated with π-backdonation. Addition of one equivalent of pyridine to a solution of 3.C$_{10}$H$_8$ in C$_6$D$_6$ resulted in a new paramagnetic shift resonance with the absence of free pyridine signals in the $^1$H NMR spectrum. Formation of ($^{acri}$PNP)Ni(py) was confirmed from the frozen solution X-band EPR data representing the new axial signals (g=2.00, 2.09, FIG. 6(c)). Bonding of pyridine is reversible, while stronger pi-accepting ligands such as CO and PMe$_3$ are irreversibly adjusted, so ($^{acri}$PNP)Ni(CO) (Compound 6) and ($^{acri}$PNP)Ni(PMe$_3$) (Compound 7), which are stable 4-coordinate species, are produced, respectively (FIG. 6). The CO vibration of Compound 4 at 1,936 cm$^{-1}$ indicates an important π-back donation phenomenon for CO of Compound 4. The X-ray structures for Compounds 6 and 7 showed that two nickel centers had pyramidal geometries (τ4=0.50 and 0.37, respectively, L. Yang et al., Dalton Trans. 2007, 955). The average angles between planes of the two aryl rings are 9.08° (4) and 37.25° (5), and the distances between the nickel ions and the $^{acri}$PNP plane thereof are 0.699 Å (4) and 0.609 Å (5). This geometric change reduces the M-L anti-bonding interaction in the SOMO identified in the DFT analysis (FIG. 5).

T-shaped metal radical Ni$^I$ complexes were used to evaluate reactivity to the substrate. Because Compound 3 has a considerably exposed center of nickel with half-filled d$_{x^2-y^2}$ orbital, one electron oxidation of the metal readily occurs with formation of the nickel-ligand bond. Substrates containing double bonds such as C$_2$H$_4$ and CO$_2$ easily produced dinuclear Ni$^{II}$ species {($^{acri}$PNP)Ni}$_2$(μ-C$_2$H$_4$)) (Compound 8) and {($^{acri}$PNP)Ni}$_2$(μ-CO$_2$) (Compound 10), respectively. The XRD structure clearly shows that the C$_2$H$_4$ moiety is reduced by two electrons; C$_{sp3}$-C$_{sp3}$ exhibits a single bond property (dc−c=1.538 (6), FIG. 7(a)). This process is reversible and Compound 6 loses ethylene at room temperature under vacuum. Binuclear reduction of C$_2$H$_4$ and CO$_2$ by transition metal complexes occurs infrequently (B. de Bruin et al., Organometallics 2002, 21, 4312; M. Devillard et al., J. Am. Chem. Soc. 2016, 138, 4917). Although C$_2$H$_4$ activation was previously reported by Ir and Os complexes (B. de Bruin et al., Organometallics 2002, 21, 4312), this is the first example of C$_2$H$_4$ reduction performed by the transition metal of the first row. Previous dinuclear CO$_2$ activation was performed by a two-electron process in a single metal center, while other metal centers acted as Lewis acids (M. Devillard et al., J. Am. Chem. Soc. 2016, 138, 4917).

This binuclear 2-electron process can be carried out by using more challenging sigma-bonds for hemolytic cleavage (FIG. 4). Interestingly, Compound 3 reacts with H$_2$ (1 atm) at room temperature to produce ($^{acri}$PNP)NiH (Compound 12), which is a characteristic hydride resonance at −17.22 ppm (t, J$_{PH}$=62.4 Hz) of the $^1$H NMR spectrum. The reaction is believed to involve the interaction between two metal radicals having one H$_2$ molecule through four central transition states (BB Wayland et al., J. Am. Chem. Soc. 1991, 113, 5305; BB Wayland et al., Inorg. Chem., 1992, 31, 148). Since one meridional site transfer to the nitrogen donor of the PNP ligand is empty, the transient interaction between the SOMO (d$_{x^2-y^2}$) of Compound 3 and the σ* orbital of the H—H bond should be easy. Thus, the geometrical and electronic structures of Compound 3 depend on homolytic degradation of sigma-bonds. The weak O—H, S—S, and C—I bonds were easily cleaved to produce the corresponding $Ni^{II}$ complexes (FIG. 4), which was confirmed by comparing the $^{1}H$ and $^{31}P$ NMR spectra with the corresponding independently prepared complexes. Surprisingly, $(PNP)NiNH_2$ is produced immediately after the addition of hydrazine. N—N σ-bond of $N_2H_4$ decomposition by protonation, deprotonation or disproportionation has been previously reported, but direct homogeneous decomposition is not known.

Figure 7:
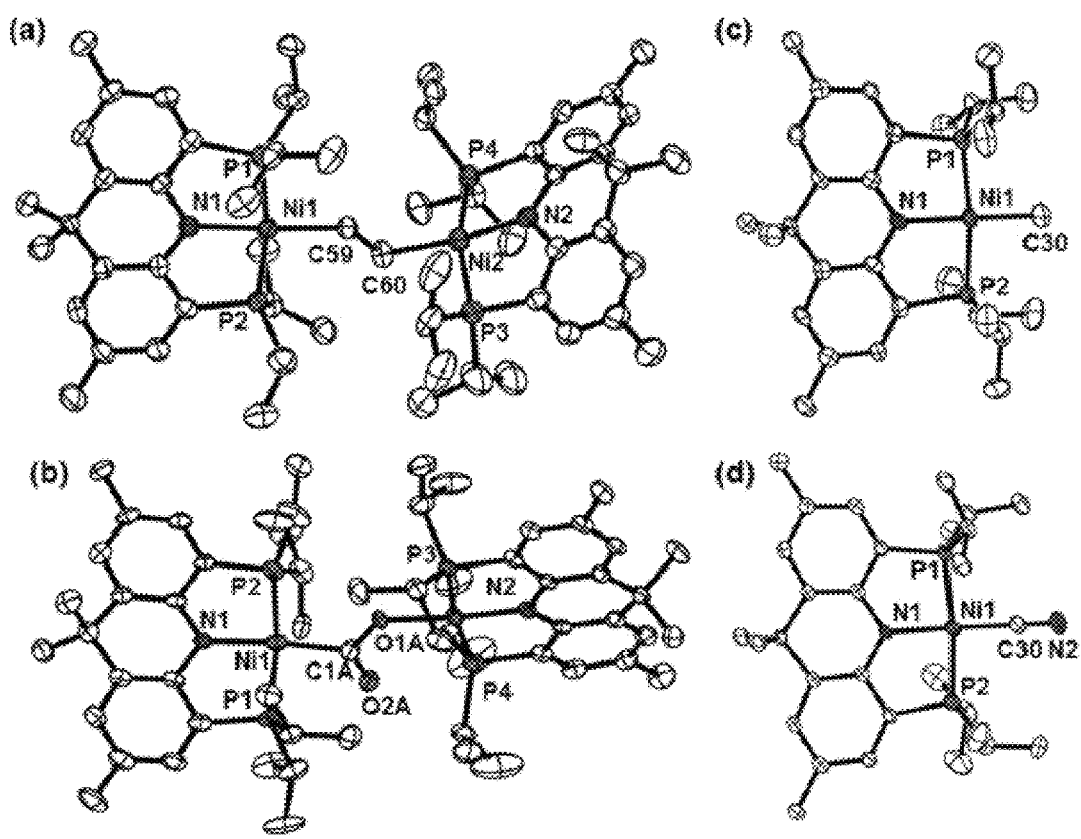
FIG. 7 shows crystal structures of Compound 8 {($^{acri}$PNP)Ni}$_2$($\mu$-C$_2$H$_4$) (a), Compound 9 ($^{acri}$PNP)Ni(CH$_3$) (b), Compound 10 {($^{acri}$PNP)Ni}$_2$($\mu$-CO$_2$) (c) and Compound 11 ($^{acri}$PNP)Ni(CN) (d) according to the present invention (wherein thermal ellipsoids are set at a probability of 50% and hydrogen atoms are omitted).

In fact, the addition of acetonitrile to Compound 3 causes unexpected results shown in FIG. 7 through C—C bond cleavage to form ($^{acri}$PNP)NiMe (compound 9) and ($^{acri}$PNP)NiCN (compound 10). C—C bond activation of acetonitrile is a difficult issue due to strong bond dissociation energy (133 kcalmol$^{-1}$) thereof. To date, various metal complexes have been known to activate the C—C bond of $CH_3CN$, but high temperature, irradiation or the addition of Lewis acid is required. C—C bond activation using Compound 3 occurs immediately under ambient conditions mediated by an open-shell $d^9$ T-shaped nickel center.

In conclusion, a certain three-coordinate $Ni^I$ complex (Compound 3) was synthesized using $^{acri}PNP^-$, a strong pincer-type ligand. Stable T-shaped $Ni^I$ species can be produced due to rigidity of $^{acri}PNP^-$. Despite the vacancy site of Compound 3, the coordination of the sigma-donor is invisible due to the σ-anti-bonding property of SOMO ($d_{x^2-y^2}$) of the $d^9$ center. Coordination of the π-acidic ligands is possible, but results in a structural change to a more stable pyramidal form. When having a sterically-exposed half-filled, $d_{x^2-y^2}$ orbital, formation of the bond between the substrate and Compound 3 is combined with the oxidation process of the metal, which reduces unsaturated molecules ($C_2H_4$ and $CO_2$). Finally, metal radicals can be more effectively utilized due to homogeneous decomposition of σ-bonds in the substrate such as $H_2N—NH_2$ and $H_3C—CN$.

INDUSTRIAL APPLICABILITY

The acridane-based PNP ligand according to the present invention is structurally stable and has novel chemical properties, as compared to conventional similar ligands, and thus can be utilized in a wide range of catalytic reactions and material chemistry. Therefore, metal complexes containing the acridane-based PNP ligand can be utilized in a variety of applications including organic and inorganic catalysis, polymer reactions, and material chemical industries. When new reactions replacing conventional catalysts can be developed and industrialized, based on this, considerably high economic and industrial value can be obtained.

Although specific configurations of the present invention have been described in detail, those skilled in the art will appreciate that this description is provided as preferred embodiments for illustrative purposes and should not be construed as limiting the scope of the present invention. Therefore, the substantial scope of the present invention is defined by the accompanying claims and equivalents thereto.

What is claimed is:

1. A metal complex in which the PNP ligand having an acridane structure represented by a following Chemical Formula 1 and a metal are bound to each other:

[Chemical Formula 1]

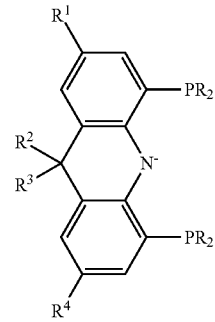

wherein R, $R^1$, $R^2$, $R^3$ and $R^4$ are each independently hydrogen, a C1 to C20 alkyl group, a halogen-substituted C1 to C20 alkyl group, a C2 to C20 alkenyl group, a halogen-substituted C2 to C20 alkenyl group, a C1 to C20 alkoxy group, a halogen-substituted C1 to C20 alkoxy group, a C3 to C20 cycloalkyl group, a halogen-substituted C3 to C20 cycloalkyl group, a C6 to C40 aryl group, a C5 to C40 heteroaryl group, halogen, C1 to C20 alkylamine, C6 to C40 arylamine, C7 to C60 alkylarylamine, a C1 to C20 thioalkyl group, a C6 to C40 thioaryl group, C1 to C20 alkyl phosphine or C6 to C40 aryl phosphine, with the proviso that when each R is C6 aryl, then $R^1$, $R^2$, $R^3$, and $R^4$ are not all hydrogen, wherein the metal is Al, Cr, Fe, Co, Ti, W, Si, Ir, Rh, Pt, Pd, Ru, Th, Ni, Cu, V, Au, Re, Zr or Mo.

2. The metal complex of claim 1, wherein the PNP ligand is represented by a following Chemical Formula 1-1:

[Chemical Formula 1-1]

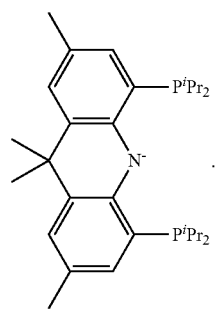

3. The metal complex of claim 1, wherein the metal complex is represented by $(PNP)MX_n$, wherein n=0, 1, 2 or 3, and X is ABC, wherein A, B and C are each independently represented by a monodentate ligand or bidentate ligand.

4. The metal complex of claim 1, wherein the metal complex is represented by following Chemical Formula 2 or Chemical Formula 3:

[Chemical Formula 2]

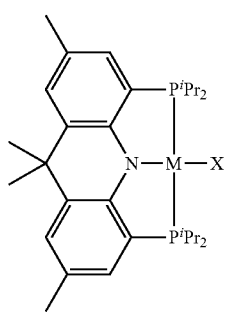

wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO$_4$ or OAc,

[Chemical Formula 3]

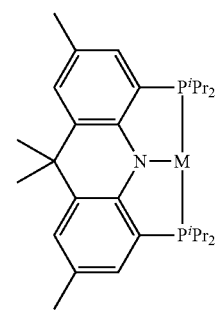

wherein M is Al, Cr, Fe, Co, Ti, W, Si, Ir, Rh, Pt, Pd, Ru, Th, Ni, Cu, V, Au, Re, Zr or Mo.

5. The metal complex of claim 1, wherein the metal complex is selected from the group consisting of Chemical Formulas 2-1 to 2-5 and Chemical Formula 3-1:

[Chemical Formula 2-1]

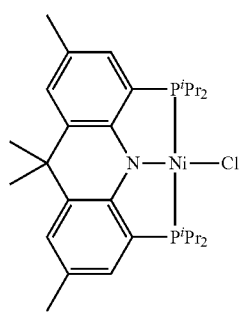

[Chemical Formula 2-2]

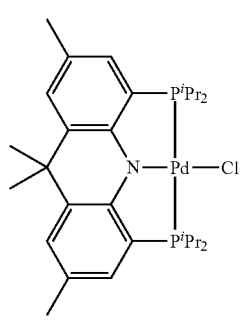

[Chemical Formula 2-3]

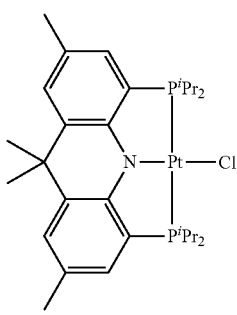

[Chemical Formula 2-4]

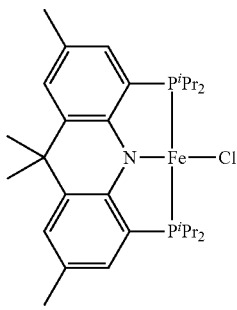

[Chemical Formula 2-5]

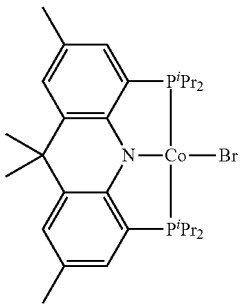

[Chemical Formula 3-1]

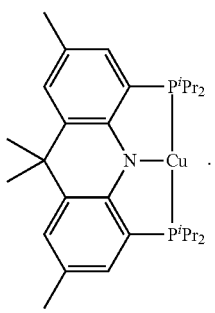

6. A method of preparing a metal complex represented by a Chemical Formula 2, comprising:

(a) producing a compound of Chemical Formula 5 by reacting a compound of Chemical Formula 4 with 3 equivalents of alkyl lithium, aryl lithium or a Grignard reagent and 2 equivalents of one compound selected from the group consisting of halogen-substituted alkyl phosphine or aryl phosphine; and (b) producing a metal complex of Chemical Formula 2 by adding MX$_n$, wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO$_4$ or OAc, to the compound of Chemical Formula 5 to induce metallation:

[Chemical Formula 2]

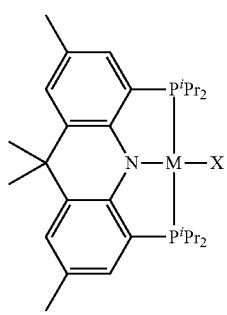

wherein M is Fe, Co, Ni, Co, Pd or Pt, and X is Cl, Br, OTf or OAc.

[Chemical Formula 4]

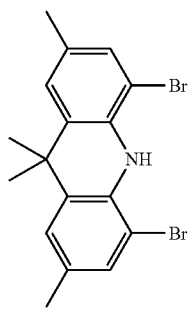

[Chemical Formula 5]

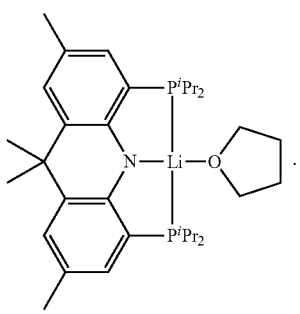

7. A method of preparing a metal complex represented by a Chemical Formula 3, comprising:
   (a) producing a compound of Chemical Formula 5 by reacting a compound of Chemical Formula 4 with 3 equivalents of alkyl lithium, aryl lithium or a Grignard reagent and 2 equivalents of one compound selected from the group consisting halogen-substituted alkyl phosphine or aryl phosphine;
   (b) producing a metal complex of Chemical Formula 2 by adding MX2, wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO₄ or OAc, to the compound of Chemical Formula 5 to induce metallation; and
   (c) producing a metal complex of Chemical Formula 3 by adding a reducing agent to the metal complex of Chemical Formula 2,

[Chemical Formula 2]

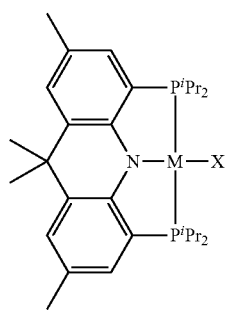

wherein M is Al, Cr, Fe, Co, Ti, W, Si, Ir, Rh, Pt, Pd, Ru, Th, Ni, Cu, V, Au, Re, Zr or Mo, and X is Cl, Br, OTf, ClO₄ or OAc;

[Chemical Formula 3]

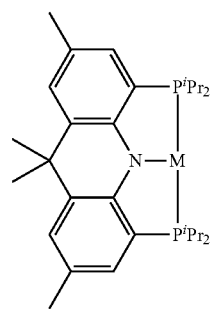

wherein M is Al, Cr, Fe, Co, Ti, W, Si, Ir, Rh, Pt, Pd, Ru, Th, Ni, Cu, V, Au, Re, Zr or Mo.

[Chemical Formula 4]

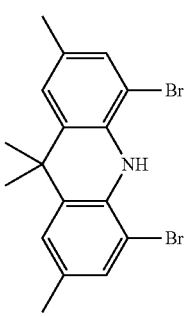

[Chemical Formula 5]

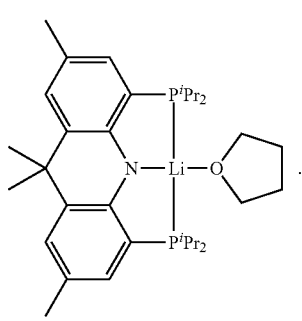

* * * * *